United States Patent
Levin et al.

(10) Patent No.: US 7,995,737 B2
(45) Date of Patent: Aug. 9, 2011

(54) ACCOMMODATION OF TWO INDEPENDENT TELEPHONY SYSTEMS

(75) Inventors: Danny Levin, Redmond, WA (US); Mahendra D. Sekaran, Sammamish, WA (US); Bimal K. Mehta, Sammamish, WA (US); Li Shen, Bellevue, WA (US); Vadim Eydelman, Bellevue, WA (US); Russell P. Bennett, Sammamish, WA (US); Paul D. Tidwell, Sammamish, WA (US); Rajesh Ramanathan, Bellevue, WA (US); Gurdeep Singh Pall, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/934,967

(22) Filed: Nov. 5, 2007

(65) Prior Publication Data
US 2009/0116634 A1 May 7, 2009

(51) Int. Cl.
*H04B 7/00* (2006.01)
*H04M 3/42* (2006.01)
(52) U.S. Cl. .......... 379/221.01; 379/201.12; 379/207.13
(58) Field of Classification Search ............. 379/201.12, 379/207.13, 207.15, 221.01
See application file for complete search history.

(56) References Cited

U.S. PATENT DOCUMENTS

| | | | |
|---|---|---|---|
| 6,301,339 B1 | 10/2001 | Staples et al. | |
| 6,993,360 B2 | 1/2006 | Plahte | |
| 7,002,912 B2 | 2/2006 | Wengrovitz | |
| 7,174,189 B1 | 2/2007 | Chen et al. | |
| 2003/0165231 A1 | 9/2003 | Singh et al. | 379/265.09 |
| 2004/0008837 A1 | 1/2004 | Sylvain | |
| 2004/0218583 A1 | 11/2004 | Adan et al. | |
| 2005/0141691 A1 | 6/2005 | Wengrovitz | |
| 2006/0030357 A1 | 2/2006 | McConnell et al. | |
| 2007/0005729 A1 | 1/2007 | Cox et al. | |
| 2007/0206563 A1 | 9/2007 | Silver et al. | 370/351 |

FOREIGN PATENT DOCUMENTS

| | | |
|---|---|---|
| KR | 1020030063064 | 7/2003 |
| KR | 1020070040493 | 4/2007 |
| WO | WO2009061727 | 5/2009 |

OTHER PUBLICATIONS

International Search Report in connection with international application No. PCT/US2008/082346, issued Apr. 28, 2009.
Enhanced Call Forwarding http://www.vonage.com/help.php?keyword=CallForwarding_SimulRing.
Integrating Internet Telephony Services http://www1.cs.columbia.edu/~xiaotaow/rer/Research/Paper/ic.pdf.
RFC 2543 SIP: Session Initiation Protocol http://www.rfc-editor.org/rfc/rfc2543.txt.
Feature Interaction in Internet Telephony http://www1.cs.columbia.edu/~lennox/featint.pdf.

*Primary Examiner* — Rasha S Al Aubaidi
(74) *Attorney, Agent, or Firm* — Merchant & Gould (57) ABSTRACT

Independent telephony systems are integrated by using symmetric forking from both systems. Calls received by either system are forked to the other system. Thus, a call can be accepted by one of the systems, using its external interfaces, and presented to all devices in both systems. Each system is enabled to leverage internal call control advanced features to enhance overall user experience. Internally inserted parameters to call requests are used between the two systems for preventing endless loop of calls between the integrated systems.

20 Claims, 8 Drawing Sheets

ACCOMMODATION OF TWO INDEPENDENT TELEPHONY SYSTEMS

BACKGROUND

In telecommunication, telephony is the term for the general use of equipment to provide voice communication over distances, specifically by connecting telephones to each other. Telephones originally were connected directly together in pairs. Each user had separate telephones wired to the various places they might wish to reach. With the invention of the telephone exchange, each telephone could be connected to other local ones and eventually far away phones.

In modern systems, equipment at the exchange connects a telephone line to another in the same wire center, or to a trunk to a distant exchange when the user of a telephone wants to make a telephone call. The exchanges together form the Public Switched Telephone Network ("PSTN"). Digital telephony is the use of digital technology in the provision of telephone services and systems. Almost all telephone calls are provided this way, but sometimes the term is restricted to cases in which the last mile is digital or where the conversion between digital and analog signals takes place inside the telephone.

IP Telephony is a modern form of telephony which uses the TCP/IP protocol popularized by the internet to transmit digitized voice data. Computer Telephony Integration ("CTI") enables computers to know about and control phone functions such as making and receiving voice, fax, and data calls with telephone directory services and caller identification. The integration of telephone software and computer systems is a major development in the evolution of the automated office. With the proliferation of various types of telephony systems, it is not uncommon to have two independent systems exist side-by-side in a location.

A user who wants to leverage telephony features from two independent systems with a single address transparent to external callers requires tight integration of the two systems. In some cases, a user may associate a device from one system, such a cell phone, with equipment from another system, such as a Private Branch Exchange ("PBX"), and leverage all the features of the equipment but may not be able to leverage at the same time the first system's (e.g. cell network) features.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling loosely coupled integration of two independent telephony systems employing symmetric forking from both systems. Each system may receive a call and "fork" to the other system allowing a call to be accepted by any system through their external interfaces and presented to any device on either system enhancing overall user experience.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, a loosely coupled integration of independent telephony systems is achieved by using symmetric forking from both systems. Calls received by either system may be forked to the other system. Thus, a call can be accepted by one of the systems, using its external interfaces, and presented to all devices in both systems. In addition, each system can leverage internal call control advanced features that provide a better overall user experience. The ability to use two systems side-by-side prevents inconsistent user experience. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
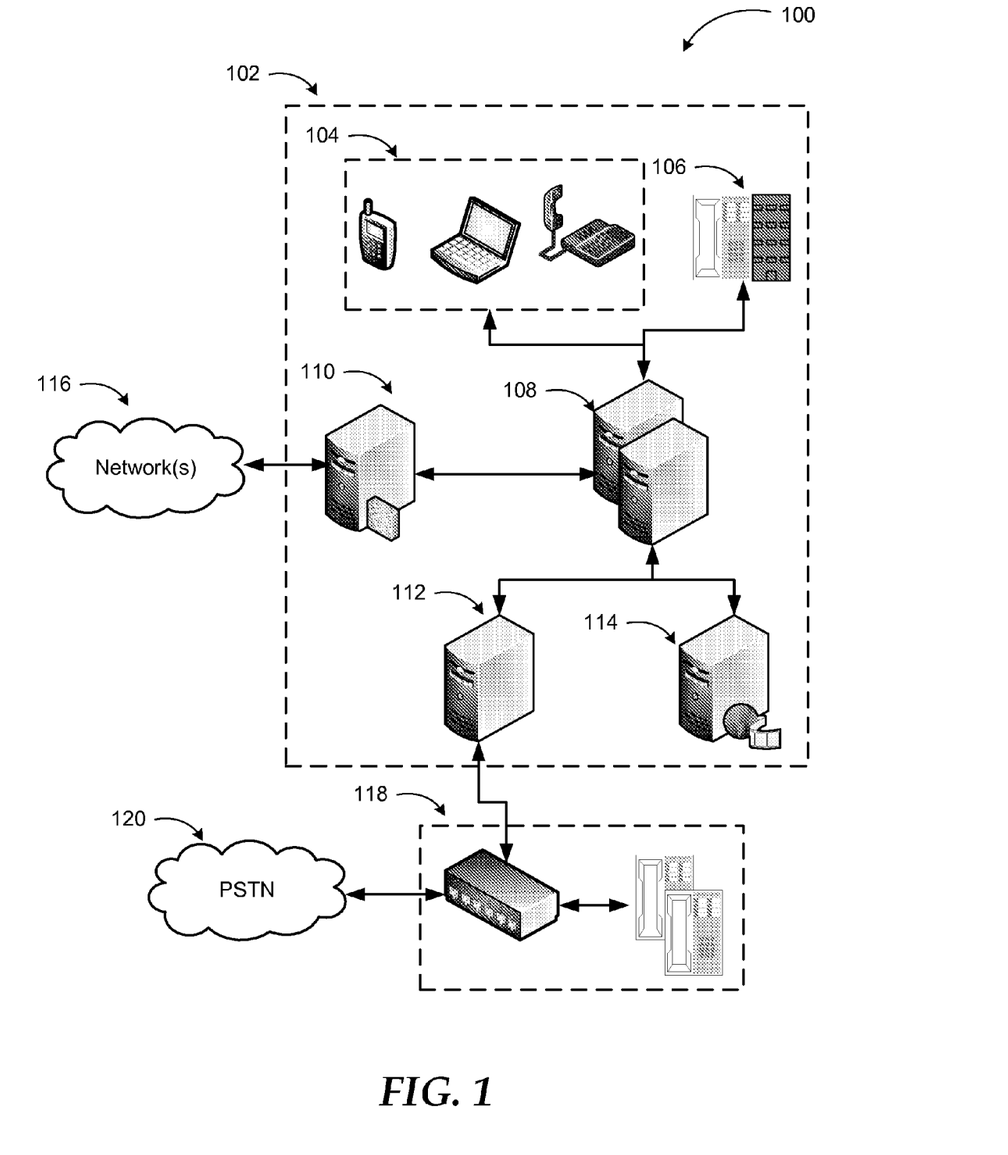
FIG. 1 is a diagram illustrating an example integrated telephony system architecture.

Referring to FIG. 1, diagram 100 of an example integrated telephony system architecture is illustrated. Integration of the two independent systems (UC 102 and PBX 118) with a smooth user experience is accomplished by employing dual forking. In the dual forking model, a telephone call may be anchored and routed by the system (UC or PBX) where the call originates. For example, calls from UC system 102 are forked by UC server 108 to the PBX system 118, and calls from the PBX/PSTN are forked by the PBX 118 to UC server 108.

In FIG. 1, end devices 104 and 106 are client devices of the UC system 102, which may execute communication applications such a voice communication, video communication, and the like. In addition to their advanced functionality, the end devices may also facilitate traditional phone calls through an external connection such as through PBX 118 and Public Switched Telephone Network (PSTN) 120. End devices may include any type of smart phone, cellular phone, computer application, and advanced phone devices with additional functionality (e.g. phone 106).

UC server 108 provides registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC server 108 is configured to provide access to these additional communication modes (e.g. instant messaging, video communication, etc.) through access server 110. Access server 110 resides in a perimeter network and enables connectivity through network 116 with other users in one of the additional communication modes.

Audio/Video (A/V) conferencing server 114 provides audio and/or video conferencing capabilities by facilitating those over an internal or external network. Mediation server 112 mediates signaling and media to and from the PBX 118. Mediation server 112 may also act as a Session Initiation Protocol (SIP) user agent (e.g. Business-To-Business User Agent "B2BUA"). PBX 118 includes a PBX controller and associated traditional phone devices. PBX 118 facilitates receipt and origination of calls through PSTN 120, which is typically a combination of networks managed by a number of providers.

In a system according to embodiments, users are enabled to share the same identity in both communication systems. The address for the shared identity is used in inbound and outgoing calls. Therefore, the existence of two telephony systems is transparent for other users who interact with the user of the integrated telephony systems. The shared identity is not necessarily limited to a phone number. The identity may take any form depending on the integrated networks, such as a telephone number, a SIP Uniform Resource Identifier (URI), or any other identifier. Furthermore, the shared identity may be in more than one format. For example, it may include a phone number and a SIP URI (using an alias). The phone number is used throughout this text as example for integrated networks that include a PSTN compatible network, but embodiments are not limited to phone numbers of any particular type of shared identity.

Figure 2:
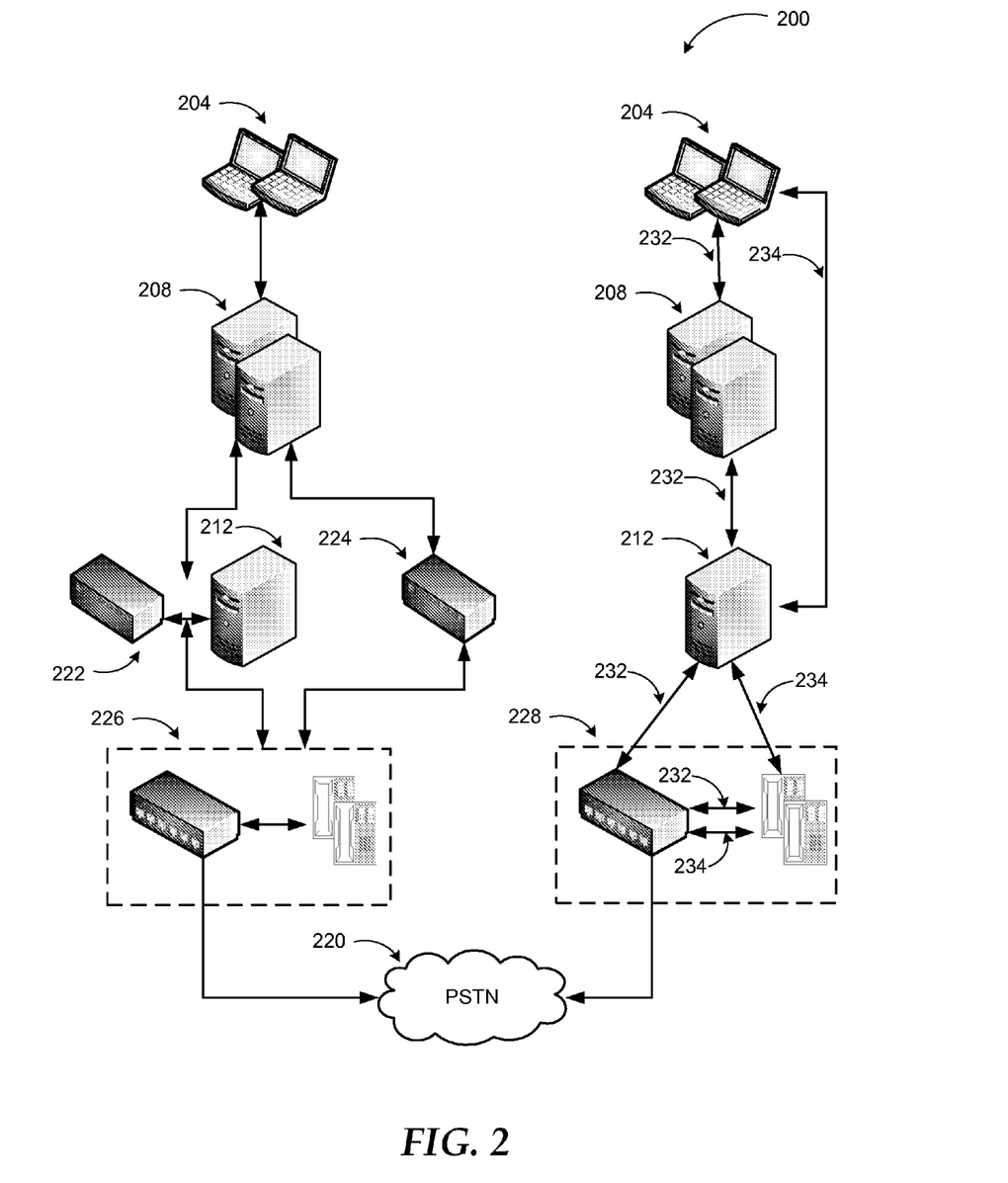
FIG. 2 illustrates another example integrated telephony system.

FIG. 2 illustrates another example integrated telephony system. Example integrated system 200 includes PBX system 228 that adheres to Session Initiation Protocol (SIP) for supporting dual forking model.

The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol ("TCP") or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP is a client/server protocol that enables peer-to-peer connectivity because each side can function as a client and a server at the same time. As such it requires a relatively simple core network with intelligence distributed to the network edge, embedded in endpoints (end devices built in either hardware or software). SIP features are implemented in the communicating endpoints (i.e. at the edge of the network) as opposed to being implemented in the network. While the example systems are described with SIP features, many other Voice over IP (VoIP) protocols exist and embodiments may be implemented with any of those protocols using the principles described herein.

Example system 200 of FIG. 2 includes two UC systems that utilize two different PBX systems. The first UC system include UC end devices 204 managed by UC server(s) 208. UC server(s) 208 may connect to Time Division Multiplex ("TDM") PBX 226 through mediation server 212, which is connected to a basic gateway 222, or through an advanced gateway 224, which may facilitate mediation server functionalities as well. Advanced gateway 224 may connect to the TDM PBX 226 through one of the PBX phones, while the mediation server 212 (and basic gateway 222) connect to the controller of the TDM PBX 226. TDM PBX 226 provides connectivity to PSTN 220.

The other system includes also UC end devices 204 (which may or may not be different depending on network configurations and types) managed by another of UC server(s) 208. UC server 208 communicates with SIP PBX 228 through mediation server 212. The second network is configured to provide SIP and or RTP based communication. If SIP is used, the communication flows between the end devices 204 and SIP PBX 228 controller through mediation server 212 and UC server 208 as indicated by the arrows with reference numeral 232. On the other hand, if RTP is employed for communication, any one of the PBX phones may communicate with mediation server 212, which may directly communicate with one of the end devices 204 through RTP as indicated by the arrows with reference numeral 234. Communications between the PBXs are facilitated through PSTN 220.

While the example systems in FIGS. 1 and 2 have been described with specific components such as mediation server, A/V server, and the like, embodiments are not limited to these components or system configurations and can be implemented with other system configuration employing fewer or additional components. Functionality of the systems enabling integration of two independent telephony systems using simultaneous dual forking may also be distributed among the components of the systems differently depending on component capabilities and system configurations.

The dual forking model is based on two independent systems, for example UC and PBX. For users provisioned for dual forking, the PBX and UC systems use the same phone number. Not all users must be provisioned for the dual forking feature. Hence, some users may have a number in one of the systems but not in the other one. The end result is that users may employ devices from both systems as one set of devices. Each system may fork calls to addresses in the other system. In the absence of a loop detection mechanism, an endless loop of calls between the two systems may result. An integrated system according to embodiments may implement a number of approaches to prevent such endless loops.

According to one embodiment, the UC server may not fork a call that has been received from the PBX system to the PBX system. According to another embodiment, the UC application being executed over the UC server and the end devices may reject a suspected loop call from the PBX system and return a warning response to the UC server, which in turn provides a warning response to the PBX system. According to a further embodiment, the UC server may insert a SIP header (e.g. the "call_source" header shown in subsequent figures) in every INVITE message for establishing a call that is forked to the PBX. The SIP header may notify the PBX that it should suppress forking of the call back to the UC server.

Either UC server or the PBX can forward or redirect an incoming call without notifying the other system. As a result, one system may continue alerting the phone with the original destination address. In order to mitigate this potential challenge, UC server and the PBX may return a warning response to the other system whenever a call is forwarded or deflected locally. If UC server or the PBX adds more destination addresses, then it may not return the warning response. The system that receives the warning response may stop alerting its local phones and keep active only the call leg that is forked to the other system.

Figure 3:
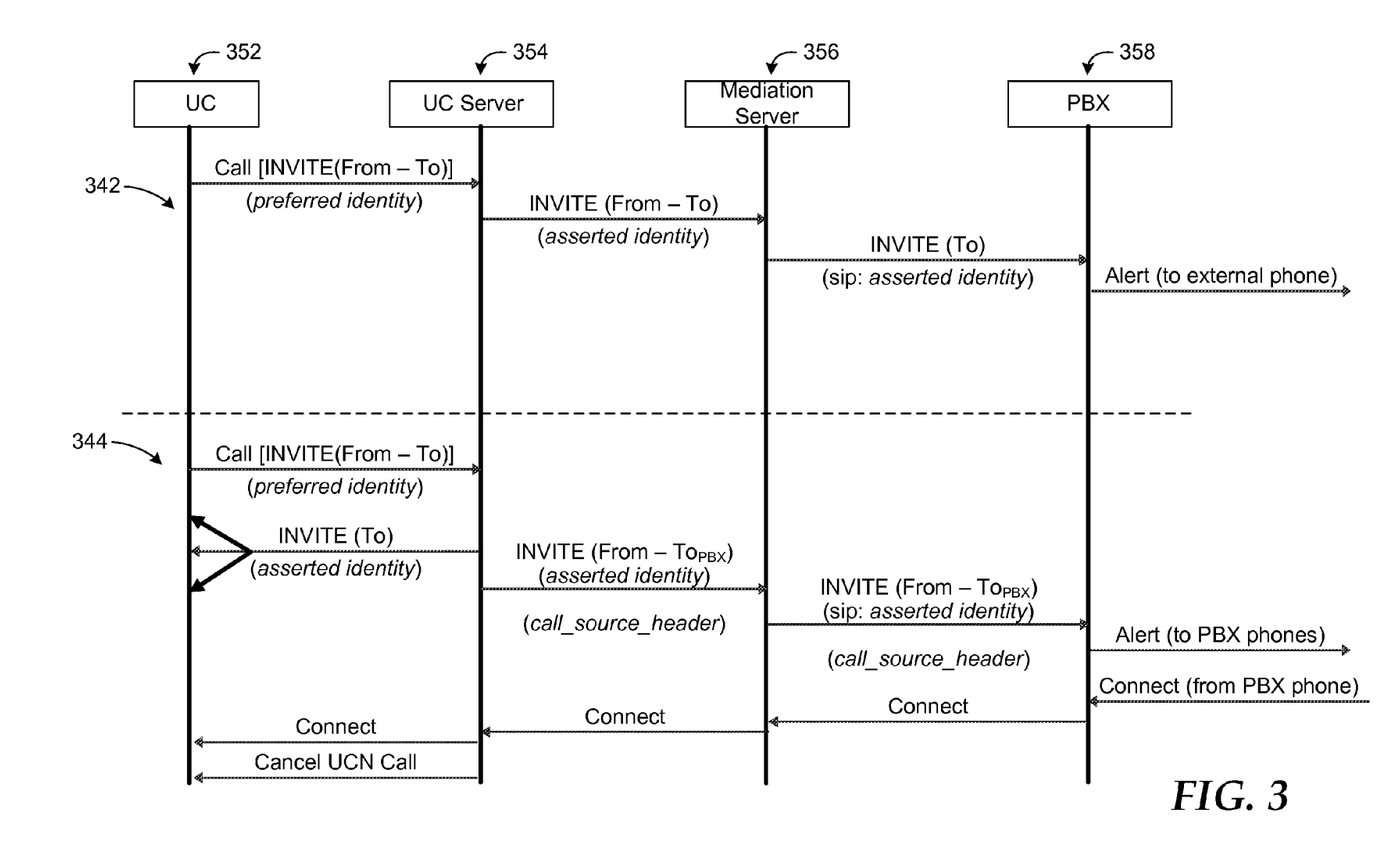
FIG. 3 is an action flow diagram illustrating actions in an integrated telephony system according to embodiments for calls originating from a unified communication system client.

FIG. 3 is an action flow diagram illustrating actions in an integrated telephony system according to embodiments for calls originating from a unified communication system client.

Unified Communications (UC) application 352 is the communication application that manages the communications through the end devices such as those described in conjunction with FIGS. 1 and 2. The application may be executed locally on the end devices or in a distributed manner over the end devices (UC clients) and servers (such as UC server 354). UC server 354 provides registration, presence, and routing functionality as discussed earlier. Mediation server 356 mediates signaling and media between PBX 358 and UC system. Finally, PBX 358 provides an interface for the UC system to the PSTN as well as being a separate telephony network on its own.

According to the first scenario 342, a call request is made from one of the UC end devices with an INVITE message being sent from UC application 352 to UC server 354. The INVITE message may include names of the originating user and destination user as well as a preferred identity for the originating user. The names are identifiers for the users assigned by the UC system and may be numeric or alphanumeric. The preferred identity is a numeric identifier and may be a PSTN telephone number for the originating user in one embodiment.

UC server 354 forwards the message to mediation server 356. UC server 354 may facilitate advanced functionality such as routing the INVITE message to the mediation server 356 according to a least cost routing logic. Mediation server 356 originates a dialog with PBX 358 by sending the INVITE message. The "From" identifier in the message may be replaced with a phone number that is derived from the asserted identity for the originating user. PBX 358 routes the call to the destination by alerting external phones. The PBX may change the destination address based on a PBX policy or dial plan.

According to the second scenario 344, a call is initiated through UC application 352 similar to the described call above. Differently from the first scenario, in this case the call is to a UC user. Therefore, UC server 354 performs a reverse number lookup (RNL) upon receiving the INVITE message and determines that the destination user is a UC user who is provisioned for dual forking. UC server 354 routes the INVITE message to mediation server 356 with the destination user's provisioned PBX address (To$_{PBX}$). Mediation server 356 originates a new dialog with PBX 358 replacing the "From" identifier with a phone number derived from the asserted identity in the INVITE message. PBX 358 routes the call to the destination user's PBX phone (or phones). UC server 354 cancels the UCN call upon facilitating the connection through the destination user's PBX phone.

Figure 4:
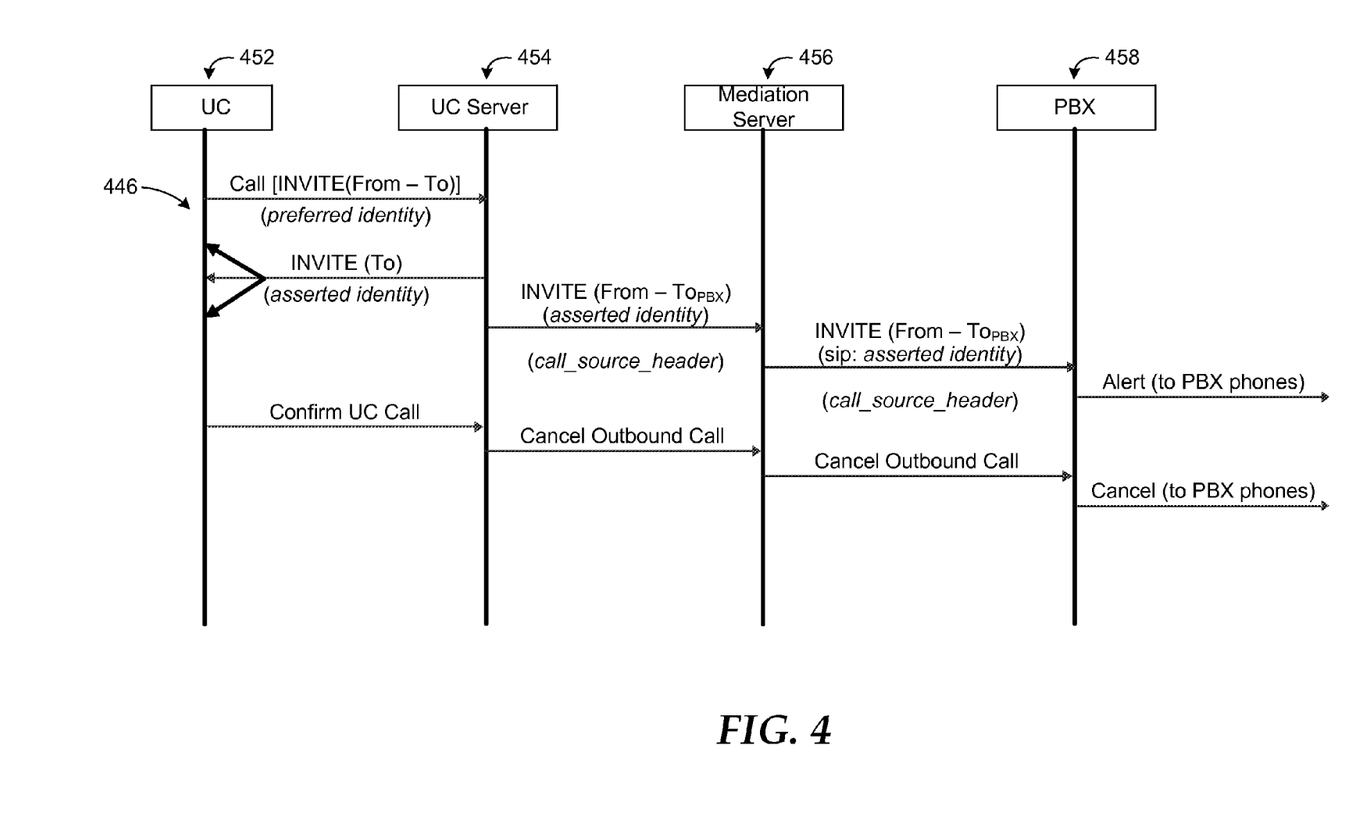
FIG. 4 is an action flow diagram illustrating actions in an integrated telephony system according to embodiments for calls being answered by a unified communication system client.

FIG. 4 is an action flow diagram illustrating actions in an integrated telephony system according to embodiments for calls being answered by a unified communication system client.

According to scenario 446, a call is initiated through UC application 452 similar to the described call above. UC server 454 performs a reverse number lookup (RNL) upon receiving the INVITE message and determines that the destination user is a UC user who is provisioned for dual forking. UC server 454 routes the INVITE message to all registered clients of the destination user (as identified by the "To" header). UC server 454 also routes the INVITE message to the mediation server 456 with the user's PBX address and a call source header. Call source header provides information if the INVITE message originates from the UC server or from the PBX. This header may be used to prevent loops as discussed previously. For example, one value for the call source header may notify the PBX that the call was forked from the UC server, and another value may be inserted by the mediation server in an inbound call from the PBX. The header may be stripped by the UC server if the destination user is not provisioned for dual forking or the destination address is changed when the call is forwarded.

Mediation server 456 routes the message to PBX 458 replacing the "From" header with a phone number derived from the asserted identity. PBX 458 alerts the PBX phones in response to the received INVITE. However, at the same time, UC application 452 notifies UC server 454 confirming the establishment of the UC call between the originating user and the destination user. In response, the UC server 454 provides mediation server 456 with a cancel message, which is forwarded to the PBX 458, which cancels the call to the PBX phones. UC server and the PBX may use a SIP CANCEL message to cancel a call that was forked to the other system in parallel with local devices when the call is answered locally. As a result, the system or the client that receives a CANCEL message may treat the call as a missed call. Therefore, the UC server (and the PBX, if it can) may send a reason code along with a CANCEL message.

According to another embodiment, mediation server 456 may route an outbound call to the destination user's PBX phone(s). Although there may be a rule in the PBX that every incoming call to the destination user's phone is to be forked to her UC SIP identifier (that is associated with her registered clients), the PBX may not fork the call because it supports the call source header.

Figure 5:
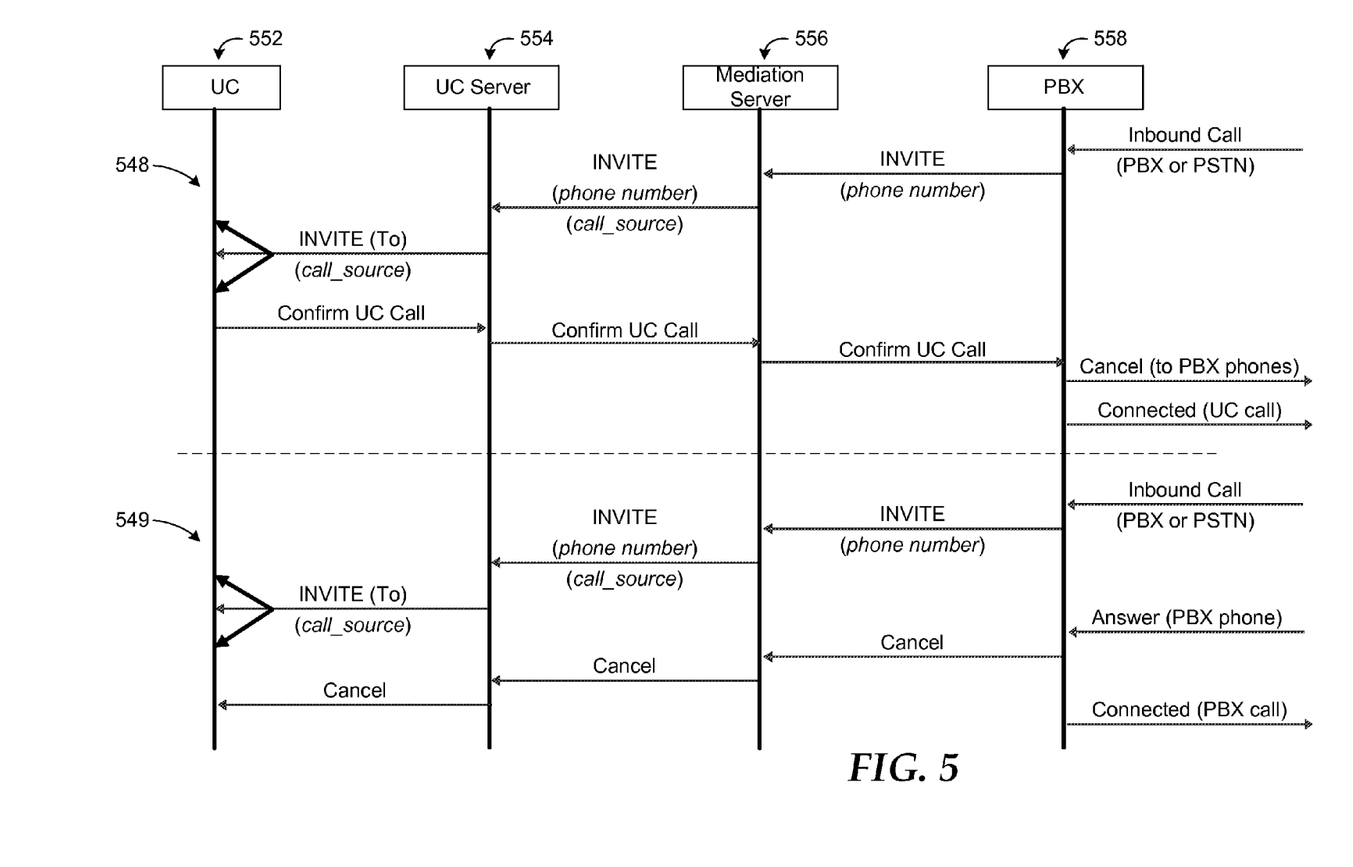
FIG. 5 is an action flow diagram illustrating actions in an integrated telephony system according to embodiments for inbound calls being answered by a unified communication system client and by a PBX phone.

FIG. 5 is an action flow diagram illustrating actions in an integrated telephony system according to embodiments for inbound calls being answered by a unified communication system client and by a PBX phone.

According to first scenario 548, PBX 558 receives a call from the PSTN (or from a PBX extension) to one of the UC user's phone number, which is provisioned for dual forking. PBX 558 alerts mediation server 556 with an INVITE message that includes the user's phone number. PBX 558 may at the same time alert one or more of the user's PBX phones. Mediation server 556 sends an INVITE message to UC server 554 inserting call source header. UC server 554 normalizes the number (e.g. based on the phone-context attribute). UC server 554 may also perform a reverse number lookup to determine the user and insert the user's identifier (name) into the INVITE message. UC server 554 then routes the INVITE message to the clients registered for the user with the UC system. When the call is confirmed by one of the clients, the confirmation message is forwarded to PBX 558, which connects the call to the responding client and cancels the calls to the PBX phone(s) for the user.

According to a second scenario 549, a PSTN or PBX extension call arrives as described above. The initial exchange of messages between the servers and the PBX controller are similar to the actions in the first scenario. Differently from the first scenario, however, the called user responds with one of their PBX phones in this case. In response, PBX 558 sends a cancel message upon establishing the phone call with the PBX phone to the mediation server 556, which is forwarded all the way to UC 552. Thus, the call is facilitated through PBX system and not the UC system.

The operations and approaches, as well as components of an integrated telephony system, described in FIG. 3-5 are exemplary for illustration purposes. An integrated telephony system employing simultaneous dual forking may be implemented using additional or fewer components and other schemes using the principles described herein.

Figure 6:
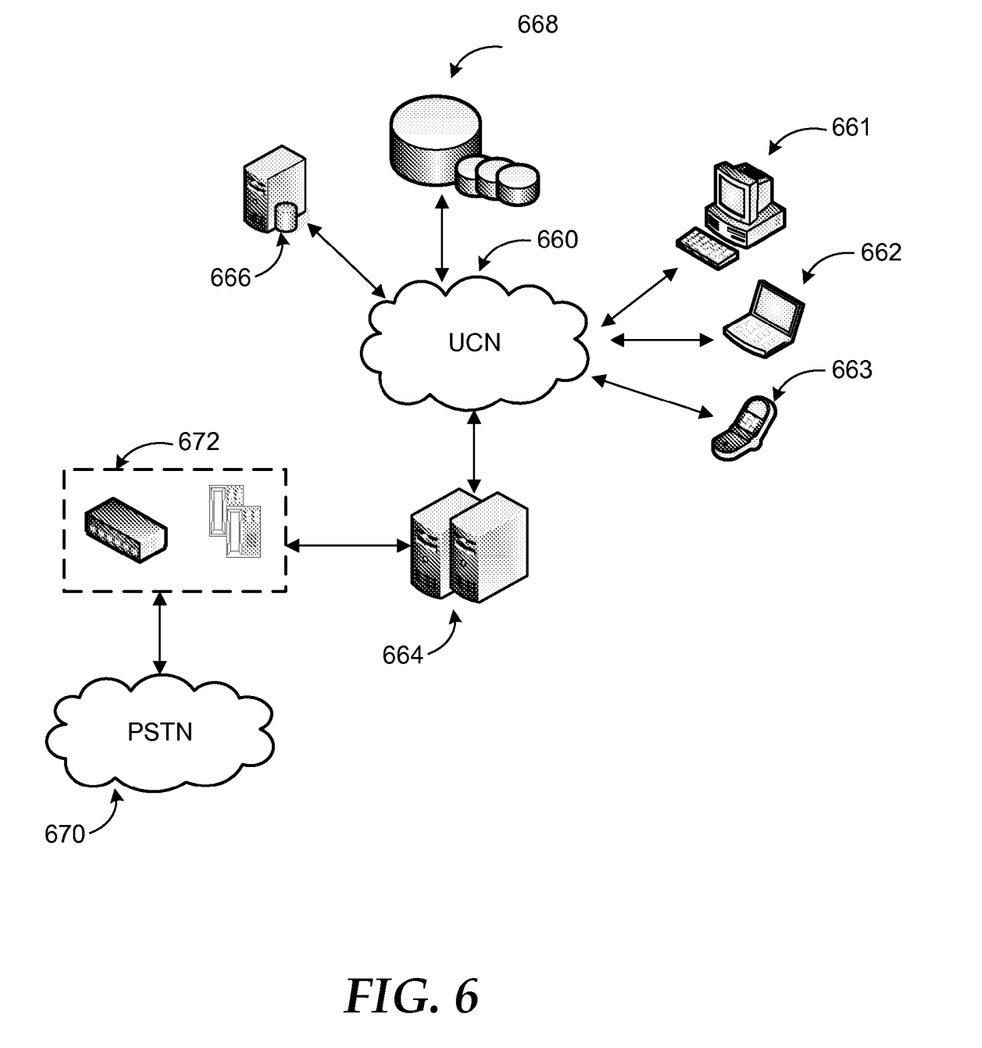
FIG. 6 illustrates a networked environment where embodiments may be implemented.

FIG. 6 is an example networked environment, where embodiments may be implemented. An integrated telephony system such as those described previously may be implemented locally or in a distributed manner over a number of physical and virtual clients and servers. Such a system may typically involve at least two distinct networks such as PSTN 670 and UCN 660. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. While an integrated telephony system employing dual forking may involve many more components, typical and relevant ones are discussed in conjunction with this figure.

One of the systems within the integrated telephony system may be a PSTN based PBX system such as PBX 672, which itself may comprise one or more controllers and a number of phone devices. The PBX system may reside side-by-side with a more advanced digital telephony system such as a unified communication system employing dual forking for smooth user experience. Mediation server(s) 664 may provide signaling and media exchange between the two systems. The UC system may also include a UC server (not shown) for registering, routing, and other functionality. Data associated with the system configuration (e.g. user names, phone numbers, call policies, configuration, records, etc.) may be stored in one or more data stores such as data stores 668, which may be directly accessed by the servers and/or clients of the system or managed through a database server 666. The backbone of the UC system may be provided by a UC network (UCN) 660, which may employ a number of protocols such as SIP, RTP, and the like. Client devices (e.g. 661-663) provide platforms for UCN user end points. Users may access the communication system using a client device or one or more client applications running on a client device.

UCN 660 may include a secure network such as an enterprise network, an unsecure network such as a wireless open network, or the Internet. UCN 660 provides communication between the nodes described herein. By way of example, and not limitation, UCN 660 may include wired media such as a wired network or direct-wired connection, and wireless media such as acoustic, RF, infrared and other wireless media.

Many other configurations of computing devices, applications, data sources, data distribution systems may be employed to implement an integrated telephony system with dual forking. Furthermore, the networked environments discussed in FIG. 6 are for illustration purposes only. Embodiments are not limited to the example applications, modules, or processes.

Figure 7:
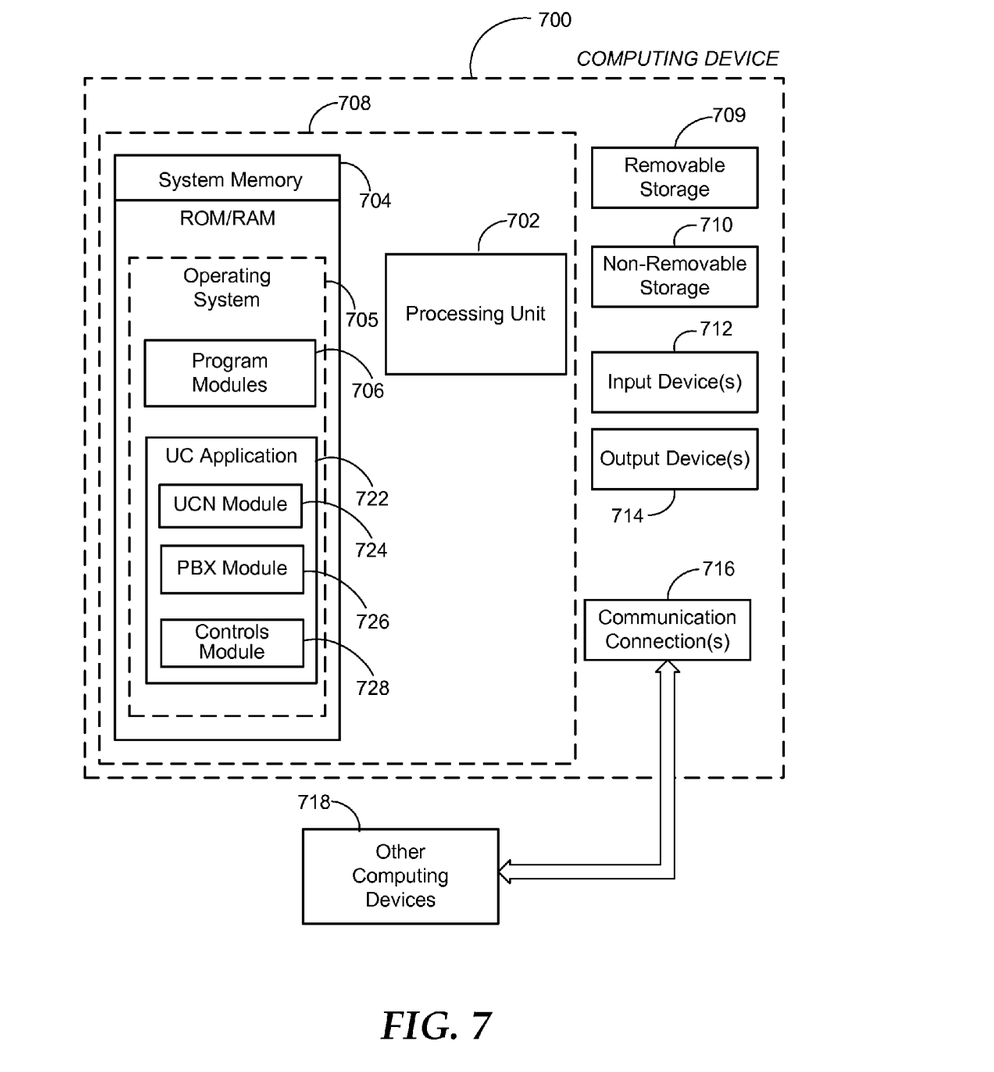
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a server executing a communication application that resides side-by-side with another communication system such as a UC application integrated with PBX system. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, UC application 722, UCN module 724, PBX module 726, and controls module 728.

UC application 722 may be a separate application or an integral module of a hosted service application that provides advanced communication services through computing device 700. UCN module 724 provides signal routing, registration, and communication facilitation services with the end devices of the UC system leg of the integrated telephony system, as described previously. PBX module 726 is configured to facilitate communication with the PBX system and may be an independent module or part of UC application 722. Controls module 728 may provide services associated with advanced functionalities of the UC system such as those associated with other forms of communication (video, instant messaging, etc.). This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include client devices of a UC network as discussed above. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
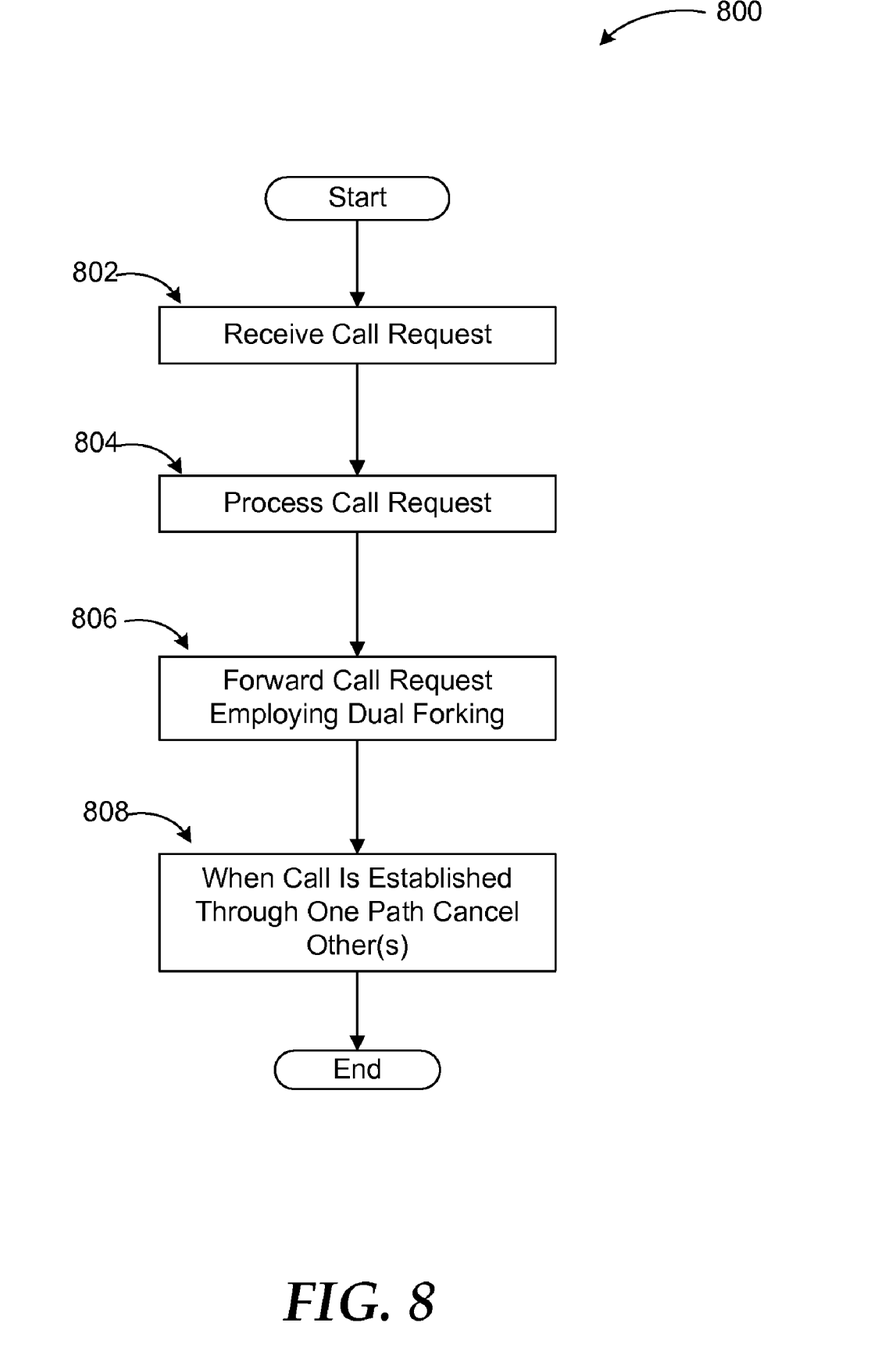
FIG. 8 illustrates a logic flow diagram for a general process of facilitating calls in an integrated telephony system according to embodiments.

FIG. 8 illustrates a logic flow diagram for general process 800 of facilitating calls in an integrated telephony system according to embodiments.

Process 800 begins with operation 802, where a call request is received. The call request may be received from one of the users of one of the integrated telephony systems or from an outside caller. The request may be destined to a user of one of the integrated telephony systems or to an outside address. The integrated networks may include distinct features and advanced services. Therefore, received call request may be handled differently depending on its origination and destination and which network it arrives in. Processing advances from operation 802 to operation 804.

At operation 804, the received call request is processed. Processing may include dissolving a phone number to determine an internal user's address, determining a phone number for an originating internal user from a user name or call source header, determining whether the call is an internal call (from one user to another user of the integrated networks), determining available clients registered with an originating user or destination user, and the like. Processing continues to operation 806 from operation 808.

At operation 808, the processed call request is forwarded to one or more destinations employing dual forking. For example, if the call is an inbound call and the destination user has multiple clients on both systems, the call may be forwarded to clients on both systems with the caveat that the forwarded call on either system is to be cancelled once the other one is selected for the call (usually by user indication). A similar approach may be employed for calls that originate within the integrated system and are destined for a user of the same system. In an integrated telephony system according to embodiments, user may have a choice to select a client on either system of the integrated communication network. Processing advances to operation 808 from operation 806.

At operation 808, the call is established upon response by one of the clients of the destination user (or by the outside called party) through one of the multiple paths available in an integrated telephony system. Once the call is established, other paths (i.e. other clients registered to the same user that are alerted about the call) may be cancelled to prevent false missed call notifications or endless loops. After operation 808, processing moves to a calling process for further actions.

The operations included in process 800 are for illustration purposes. Integrating two telephony systems employing dual forking may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating communications in an integrated telephony system through dual forking, the integrated telephony system comprising a first system and a second system with at least one of the systems being connected to an external communications network, the method comprising:
   receiving a request for a phone call from a user provisioned for dual forking in the integrated telephony system;
   determining a source identifier, a destination address, and a preferred identity for the user;
   if the destination address is outside the integrated system:
      routing the request to the second system after replacing the source identifier with an external identity derived from the preferred identity and the destination address with a destination phone number, wherein the external identity identifies the user on either one of the first and second system in a transparent manner to a called party at the destination phone number; and upon establishing connection with the called party at the destination phone number, facilitating communications through an end device registered to the requesting user in one of the first system and the second system;

if the destination address is inside the integrated system:
determining the called party by performing a reverse number lookup based on the destination address;
determining an available end device for the called party in at least one of the first system and the second system; and
facilitating communications through the available end device for the called party in one of the first system and the second system.

2. The method of claim 1, further comprising:
receiving an inbound call from an external caller addressed to an external identity assigned to one of the users of the integrated system provisioned for dual forking;
determining an identifier for the called user based on the called external identity, wherein the external identity is the same on both systems for the called user;
routing a call request based on the inbound call to available end devices registered to the called user in the first and second systems using the identifier;
upon establishing connection with the called user through one available end device, facilitating communications with the external caller and cancelling call requests to other end devices registered to the called user.

3. The method of claim 2, wherein the external identity is a phone number.

4. The method of claim 2, further comprising:
if the inbound call is one of forwarded and redirected in one of the first and second systems, returning a warning response to the other one of the first and second systems such that the other system stops alerting local end devices in the other system.

5. The method of claim 1, wherein the end device includes a physical communication device, a communication application executed on a physical device, and a voicemail application; and
the method further comprises determining an available end device through at least one of a default policy and a user set policy.

6. The method of claim 5, further comprising:
preventing an endless loop of calls within the integrated system by employing one of:
not routing a call that has been received from one of the first and the second systems to the same system;
rejecting a suspected loop call in a destination system of the first and second systems and returning a warning response to an origination system of the first and second systems; and
inserting a parameter to a call request in the destination system for notifying the origination system to suppress routing of a call back to the destination system.

7. A telephony system for integrated operation with another telephony system through dual forking, the system comprising:
a communication server for registering end devices with users, enforcing presence policies, and routing calls;
a plurality of end devices for facilitating phone calls and other communication operations for registered users;
a mediation server for mediating signaling and communication between the telephony system and the other telephony system; and
a communication application executed in at least one of the communication server and the plurality of end devices, the communication application configured to:
in response to a request for a phone call from a user, determine a source identifier, a destination address, and a preferred identity for the user;
if the destination address is outside the telephony systems:
route the request to the mediation server for further routing to the other system after replacing the source identifier with a phone number derived from the preferred identity and the destination address with a destination phone number, wherein the derived phone number identifies the user regardless of which system the user is calling from in a transparent manner to a called party at the destination phone number; and
if the destination phone number responds, determine one of the plurality of end devices to be used for facilitating the phone call; and
provide a confirmation message to the other telephony system that the phone call is being facilitated through one of the plurality of end devices of the telephony system; and
if the destination address is inside the integrated system:
determine a destination user by performing a reverse number lookup based on the destination address;
determine an available end device for the destination user in at least one of the telephony system and the other telephony system; and
facilitate communications through the available end device for the destination user in one of telephony system and the other telephony system.

8. The system of claim 7, wherein the communication application is further configured to:
receive a call request based on an inbound call from an external caller addressed to a phone number assigned to one of the users of the telephony system;
determine an identifier for the called user based on called phone number;
determine an available end device registered to the called user;
route the call request to the available end device, wherein the assigned phone number identifies the user regardless of which system the available end device belongs to; and
upon establishing connection with the called user, facilitate communications with the external caller and provide a confirmation response to the other telephony systems for cancelling call requests to other end devices registered to the called user in the other telephony system.

9. The system of claim 7, further comprising:
an access server configured to facilitate at least one of instant messaging and video communication with other users through a peripheral network; and
an audio/video server configured to provide at least one of audio conferencing and video conferencing with other users.

10. The system of claim 7, wherein the other telephony system is a Time Division Multiplex (TDM) Private Branch Exchange (PBX) system, and the system further comprises one of:

a basic gateway to coordinate mediation of signaling with the TDM PBX system in conjunction with the mediation server; and an advanced gateway with mediation functionality to coordinate mediation of signaling with the TDM PBX system in place of the mediation server.

11. The system of claim 7, wherein the other telephony system is a Session Initiation Protocol (SIP) PBX system, and the mediation server is further configured to communicate with the SIP PBX system and the communication server employing SIP.

12. The system of claim 11, wherein the mediation server is further configured to communicate with the SIP PBX system and the end devices employing Real Time Protocol (RTP).

13. The system of claim 11, wherein the mediation server is further configured to act as a SIP user agent.

14. The system of claim 7, wherein the communication server is further configured to route calls according to a least cost routing logic.

15. The system of claim 7, further comprising:
a data store configured to store information associated with at least one from a set of: user identifiers, user phone numbers, call routing policies, system configuration, presence policies, and call records.

16. A computer-readable storage medium with instructions stored thereon for facilitating communications in an integrated telephony system through dual forking, the integrated telephony system comprising a unified communication (UC) system and a Private Branch Exchange (PBX) system with the PBX system being connected to a Public Switched Telephone Network (PSTN), the instructions comprising:
in response to receiving a request for an outbound phone call from a user of the UC system:
determining a source identifier, a destination address, and a preferred identity for the user;
routing the request to the PBX system after replacing the source identifier with a phone number derived from the preferred identity and the destination address with a destination phone number, wherein the derived phone number identifies the user in a transparent manner to a called party at the destination phone number in both PBX and UC systems; and
upon establishing connection between an end device registered to the user and the destination phone number, notifying the PBX system to prevent callback loops;

in response to receiving a request for an phone call from a user of the UC system to another user of the integrated telephony system:
determining a destination user by performing a reverse number lookup based on the destination address;
determining an available end device for the destination user in at least one of the UC system and the PBX system; and
facilitating communications through the available end device for the destination user; and in response to receiving a request for an inbound phone call to a user of the UC system from the PBX system:
determining an identifier for called user based on a called phone number;
routing the request for the inbound call to available end devices registered to the called user in the UC system using the identifier;
upon establishing connection with the called user through one available end device, facilitating communications and notifying the PBX system for cancelling call requests to PBX phones registered to the called user.

17. The computer-readable storage medium of claim 16, wherein the request is routed employing SIP protocol and the instructions further comprise:
routing the request between the UC system and the PBX system employing an invite message that includes the source identifier and the destination address.

18. The computer-readable storage medium of claim 16, wherein the instructions further comprise:
providing a warning message to the PBX system in response to redirecting the inbound phone call within the UC system such that the PBX system stops alerting any phones associated with the called user.

19. The computer-readable storage medium of claim 18, wherein the instructions further comprise:
inserting a phone-context attribute to an invite message for the inbound phone call; and
normalizing the called phone number received from the PBX system based on the phone-context attribute before determining the identifier for the called user.

20. The computer-readable storage medium of claim 18, wherein the instructions further comprise:
if a PBX phone associated with the called user is selected for connecting the inbound phone call, cancelling alerts to the end devices associated with the called user in the UC system.

* * * * *